(12) United States Patent
Akan et al.

(10) Patent No.: US 10,101,078 B2
(45) Date of Patent: Oct. 16, 2018

(54) REFRIGERATOR COMPRISING AN ICE CREAM MAKING MACHINE

(71) Applicant: ARCELIK ANONIM SIRKETI, Istanbul (TR)

(72) Inventors: Samet Akan, Istanbul (TR); Ali Levent Hasanreisoglu, Istanbul (TR); Urfet Demirkan, Istanbul (TR); Sunay Mutlu, Istanbul (TR)

(73) Assignee: ARCELIK ANONIM SIRKETI, Istanbul (TR)

( * ) Notice: Subject to any disclaimer, the term of this patent is extended or adjusted under 35 U.S.C. 154(b) by 0 days.

(21) Appl. No.: 14/904,421

(22) PCT Filed: Jun. 27, 2014

(86) PCT No.: PCT/EP2014/063638
§ 371 (c)(1),
(2) Date: Jan. 11, 2016

(87) PCT Pub. No.: WO2015/003924
PCT Pub. Date: Jan. 15, 2015

(65) Prior Publication Data
US 2016/0131414 A1    May 12, 2016

(30) Foreign Application Priority Data

Jul. 10, 2013    (TR) .................................. 2013 08318

(51) Int. Cl.
*A23G 9/04*    (2006.01)
*F25D 11/02*    (2006.01)
(Continued)

(52) U.S. Cl.
CPC ............. *F25D 23/12* (2013.01); *A23G 9/227* (2013.01); *F25D 23/025* (2013.01);
(Continued)

(58) Field of Classification Search
CPC ........ F25C 5/005; F25D 23/12; F25D 23/069; F25D 23/028; F25D 11/02; F25D 2317/061; A23G 9/225; A23G 9/227
(Continued)

(56) References Cited

U.S. PATENT DOCUMENTS 1,978,176 A * 10/1934 Steenstrup ............. A23G 9/106
366/149
2,317,212 A *  4/1943 Newman ............... F25D 25/021
16/341
(Continued)

FOREIGN PATENT DOCUMENTS

CN    2284370 Y    6/1998
CN    2297690 Y    11/1998
(Continued)

OTHER PUBLICATIONS

International search report for PCT application No. PCT/EP2014/063638 and references contained therein are considered to be closest material prior art and any additional references cited in the application merely define the general state of the art and/or are duplicative.
(Continued)

*Primary Examiner* — Kimberley S Wright
(74) *Attorney, Agent, or Firm* — Kilpatrick Townsend & Stockton LLP (57)    ABSTRACT

The present invention relates to a refrigerator (1) comprising a fresh food compartment (2) wherein foodstuffs to be cooled are placed, a freezing compartment (3) wherein foodstuffs to be frozen are placed, a cabinet (4) disposed into the freezing compartment (3), and a lid (5) that is situated on the front side of the cabinet (4) and that has an open position wherein access into the cabinet (4) is provided and a closed position whereto the lid (5) is brought by being rotated from the open position, wherein the front side of the cabinet (4)
(Continued)

is closed and the air inside the cabinet (4) is allowed to be at least partially discharged.

14 Claims, 6 Drawing Sheets

(51) Int. Cl.
    *F25D 23/12*     (2006.01)
    *F25D 23/02*     (2006.01)
    *A23G 9/22*     (2006.01)
    *F25D 23/04*     (2006.01)
    *F25D 23/06*     (2006.01)
    *F25D 31/00*     (2006.01)

(52) U.S. Cl.
    CPC ........... *F25D 23/028* (2013.01); *F25D 23/04* (2013.01); *F25D 23/062* (2013.01); *F25D 31/00* (2013.01); *F25D 11/02* (2013.01); *F25D 2317/061* (2013.01)

(58) Field of Classification Search
    USPC ................................... 312/404, 291; 62/344
    See application file for complete search history.

(56) References Cited

U.S. PATENT DOCUMENTS

| | | | | |
|---|---|---|---|---|
| 2,416,326 A * | 2/1947 | Knibb | | A23G 9/12 310/83 |
| 2,745,259 A * | 5/1956 | Saunders | | F25D 11/022 312/296 |
| 3,008,785 A * | 11/1961 | Gehrs | | A47B 67/005 292/DIG. 65 |
| 3,283,531 A * | 11/1966 | Horvay | | F25D 11/02 62/419 |
| 3,952,538 A * | 4/1976 | Warlick | | F25D 11/00 366/144 |
| 3,988,902 A * | 11/1976 | Jacobs | | A23G 9/12 62/136 |
| 4,095,439 A * | 6/1978 | Linstromberg | | F25C 5/005 312/274 |
| 4,551,026 A * | 11/1985 | Cristante | | A23G 9/04 366/149 |
| 4,736,600 A * | 4/1988 | Brown | | A23G 9/12 222/146.6 |
| 4,802,407 A * | 2/1989 | Negri | | A01J 25/001 99/453 |
| 5,106,199 A * | 4/1992 | Eckel | | A23G 9/12 366/147 |
| 5,513,501 A * | 5/1996 | Reed | | A23G 9/225 198/345.1 |
| 5,600,966 A * | 2/1997 | Valence | | F25D 11/04 312/401 |
| 5,737,939 A * | 4/1998 | Valence | | F25D 11/04 312/401 |
| 6,000,771 A * | 12/1999 | Wissinger | | E05D 15/505 312/401 |
| 6,220,465 B1 * | 4/2001 | Jones | | A47B 87/007 211/194 |
| 6,250,794 B1 * | 6/2001 | Huang | | A23G 9/12 366/149 |
| 6,267,049 B1 * | 7/2001 | Silvano | | A23G 9/12 366/144 |
| 6,983,566 B2 * | 1/2006 | Laun | | H02B 1/38 312/223.2 |
| 7,284,390 B2 * | 10/2007 | Van Meter | | F25C 5/005 62/344 |
| 7,530,366 B2 * | 5/2009 | Ricker | | F01C 21/007 137/312 |
| 7,796,376 B2 * | 9/2010 | Cairo | | H05K 7/20127 165/53 |
| 8,899,063 B2 * | 12/2014 | Ugolini | | A23G 9/045 62/342 |
| 9,234,690 B2 * | 1/2016 | McCollough | | F25D 21/08 |
| 9,816,748 B2 * | 11/2017 | Akan | | A23G 9/12 |
| 2003/0090958 A1 * | 5/2003 | Miller | | A23G 9/225 366/194 |
| 2004/0066122 A1 * | 4/2004 | Holmes | | A47B 81/00 312/311 |
| 2004/0104581 A1 * | 6/2004 | Lorek | | E05B 15/021 292/109 |
| 2006/0218961 A1 * | 10/2006 | Kim, II | | B67D 1/0858 62/344 |
| 2006/0260343 A1 * | 11/2006 | Martin | | F25C 5/007 62/340 |
| 2006/0260351 A1 * | 11/2006 | Coulter | | F25D 11/02 62/407 |
| 2007/0163290 A1 * | 7/2007 | Shin | | F25D 17/045 62/408 |
| 2009/0056366 A1 * | 3/2009 | Cho | | F25D 17/065 62/441 |
| 2009/0191022 A1 * | 7/2009 | Meiser | | A47B 96/00 411/378 |
| 2009/0194193 A1 * | 8/2009 | Vonderhaar | | F25D 17/042 141/65 |
| 2010/0126205 A1 | 5/2010 | Oh et al. | | |
| 2010/0175403 A1 | 7/2010 | Kim | | |
| 2010/0307187 A1 * | 12/2010 | Kwon | | F25D 23/12 62/407 |
| 2011/0219789 A1 * | 9/2011 | Grosse | | F25C 1/16 62/73 |
| 2012/0011881 A1 * | 1/2012 | Cho | | F25D 11/02 62/408 |
| 2012/0047939 A1 * | 3/2012 | Junge | | F25D 17/065 62/441 |
| 2013/0174596 A1 * | 7/2013 | Kim | | F25C 1/04 62/320 |
| 2013/0174599 A1 * | 7/2013 | Jeong | | F25D 23/087 62/344 |
| 2013/0192279 A1 * | 8/2013 | McCollough | | F25D 21/08 62/66 |
| 2013/0263620 A1 * | 10/2013 | An | | F25C 1/00 62/340 |
| 2013/0263621 A1 * | 10/2013 | An | | F25C 5/185 62/344 |
| 2013/0327079 A1 * | 12/2013 | Cho | | F25C 5/16 62/342 |
| 2013/0340463 A1 * | 12/2013 | Cho | | F25C 1/00 62/342 |
| 2016/0044954 A1 * | 2/2016 | Dunnebier | | B05C 3/08 118/19 |
| 2016/0201978 A1 * | 7/2016 | Akan | | A23G 9/12 62/342 |

FOREIGN PATENT DOCUMENTS

| | | |
|---|---|---|
| CN | 201954897 U | 8/2011 |
| CN | 102308170 A | 1/2012 |
| CN | 102353203 A | 2/2012 |
| DE | 1213870 B | 4/1966 |
| JP | H09196552 A | 7/1997 |
| MX | 2011013907 A | 6/2013 |
| WO | WO 2005100887 A1 * 10/2005 ........... F25D 17/045 |
| WO | 2010049472 A2 | 5/2010 |
| WO | 2013098038 A2 | 7/2013 |

OTHER PUBLICATIONS

Written opinion of the international searching authority for PCT application No. PCT/EP2014/063638 and references contained therein are considered to be closest material prior art and any additional references cited in the application merely define the general state of the art and/or are duplicative.

* cited by examiner

REFRIGERATOR COMPRISING AN ICE CREAM MAKING MACHINE

The present invention relates to a refrigerator comprising a cabinet wherein foodstuffs such as ice cream, etc. can be stored.

Refrigerators comprise a fresh food compartment wherein foods and beverages are stored, a freezing compartment that enables foods to be stored by being frozen, and a cabinet that is placed into the freezing compartment and that enables foodstuffs such as ice cream, etc. to be stored by being placed therein or enables ice cream to be made by placing an ice cream making device therein. In order to cool the foodstuffs in the cabinet or make ice cream, a continuous air flow must be maintained inside the cabinet. In the state of the art embodiments, various air gaps are used on the cabinet lid and the cabinet for the entry/exit of the air into/from the cabinet. However, the said air gaps may be closed if any foodstuff is placed around the cabinet inside the freezing compartment and in such a situation and it becomes possible that the air flow inside the cabinet is interrupted.

In the state of the art Chinese Patent Application No. CN102308170A, a container is disclosed, that is situated in the refrigerator as a separate compartment and that enables foodstuffs to be stored therein.

The aim of the present invention is the realization of a refrigerator comprising a cabinet that enables the foodstuffs placed therein to be cooled in an efficient manner.

Another aim of the present invention is the realization of a food storage cabinet which provides convenience in production, assembly and serviceability.

The refrigerator realized in order to attain the aim of the present invention, explicated in the first claim and the respective claims thereof, comprises a fresh food compartment wherein foodstuffs to be cooled are placed; a freezing compartment wherein foodstuffs to be frozen are placed; a cabinet that is placed into the freezing compartment; a lid that is situated on the side of the cabinet facing the user and that has an open position wherein access into the cabinet is provided and a closed position whereto the lid is brought by being rotated from the open position, wherein the side of the cabinet facing the user is closed and the air inside the cabinet is enabled to be discharged; at least one grating that is arranged on the freezing compartment wall, that faces the inside of the freezing compartment and that delivers cold air into the cabinet; at least one opening that is arranged on the cabinet rear wall and that enables the air delivered through the grating to be delivered into the cabinet; and a locking means that enables the lid to be changed from the closed position to a locking position wherein the lid is fixed to the cabinet, that assures that at least one gap providing at least partial air exit remains between the cabinet front wall and the lid, and that extends between the lid and the cabinet front wall in the locking position.

In an embodiment of the present invention, the lid is situated on the front surface of the cabinet facing the user in such a manner to be opened/closed by being rotated.

In an embodiment of the present invention, the refrigerator comprises a shelf that is situated almost at the center of the freezing compartment and the cabinet that is placed onto the shelf.

In an embodiment of the present invention, the locking means is situated on the lid, on the lid front surface, close to the lower side of the lid. Thus, the user can easily access the locking means.

In an embodiment of the present invention, the locking means is operated by the push in-pop out method that enables the lid to be changed to the locking position by the user pushing thereon and that enables the lid to be changed from the locking position to the open position again by the user pushing thereon. The locking means, seating into the cabinet when pressed thereon, enables the lid to be fixed to the cabinet and the locking means easily detaches from the cabinet when pressed thereon once more and enables the lid to be changed to the open position.

In an embodiment of the present invention, the refrigerator comprises the quadrilateral lid that is connected to the cabinet wall from one side, the locking means that is situated close to a corner of the side farthest to the said edge, and at least one extension that extends from the other corner and contacts the cabinet wall in the locking position.

In an embodiment of the present invention, the refrigerator comprises a first housing that extends from over the cabinet wall towards the front side that the cabinet faces, a second housing that extends opposite the first housing so that a distance remains therebetween, and two pins that are situated on the lid and that enable the lid to be connected to the cabinet by one thereof being seated into the first housing and the other into the second housing.

In an embodiment of the present invention, the cabinet comprises an inclined surface not parallel to the floor, that is situated on the first housing and that faces the second housing, and a flat surface that is situated on the second housing and that preferably extends parallel to the floor. After one of the pins on the lid is inserted into the second housing preferably having the flat surface, the other pin is slid over the inclined surface to be inserted into the first housing and thereby the lid is connected to the cabinet.

In an embodiment of the present invention, the lid comprises an indicator that is situated on the locking means and that indicates the position of the locking means.

By means of the present invention, a refrigerator is realized, comprising an easy-to-install cabinet wherein foodstuffs can be stored.

A refrigerator realized in order to attain the aim of the present invention is illustrated in the attached figures, where.

Figure 1:
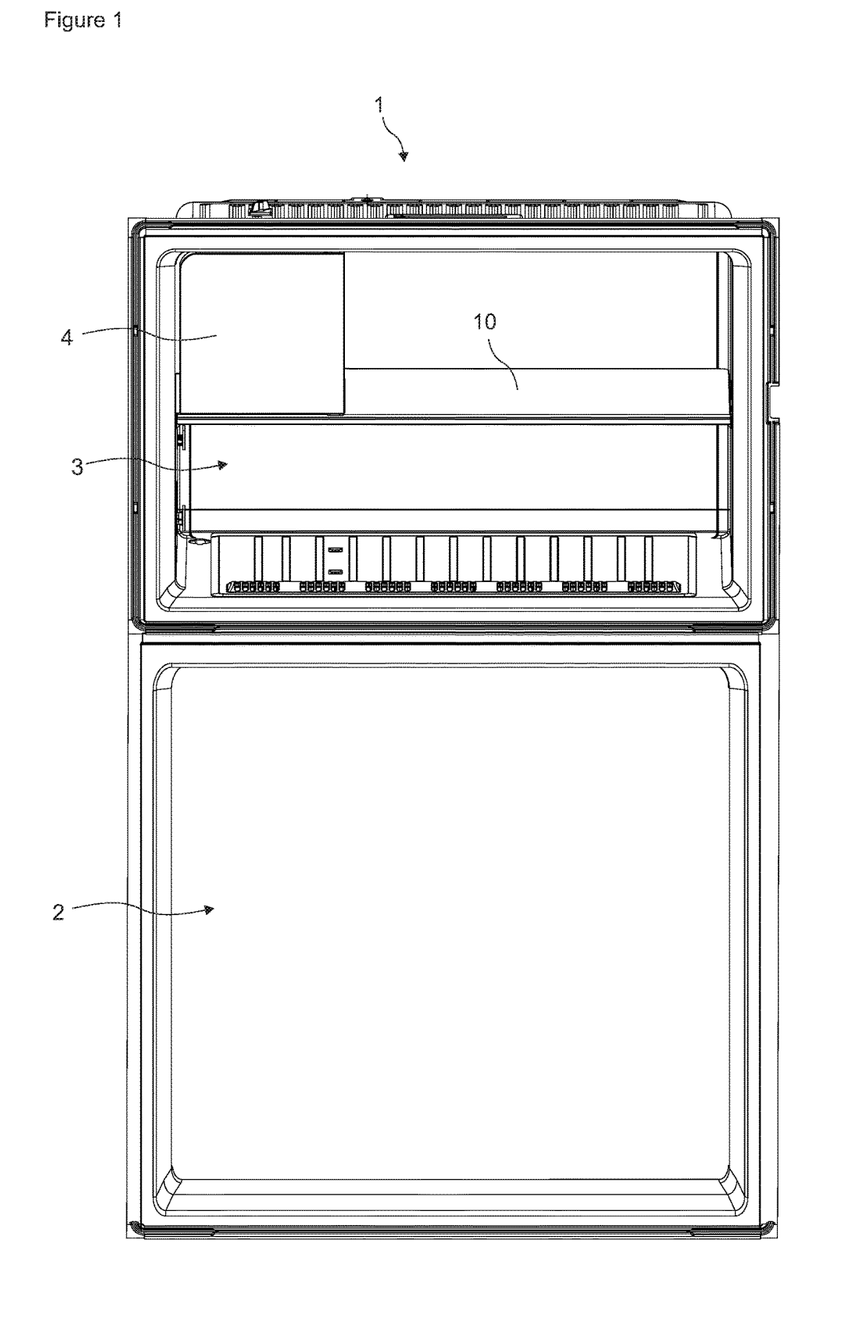
FIG. 1—is the front schematic view of a refrigerator wherein the cabinet is placed into the freezing compartment.
Figure 2:
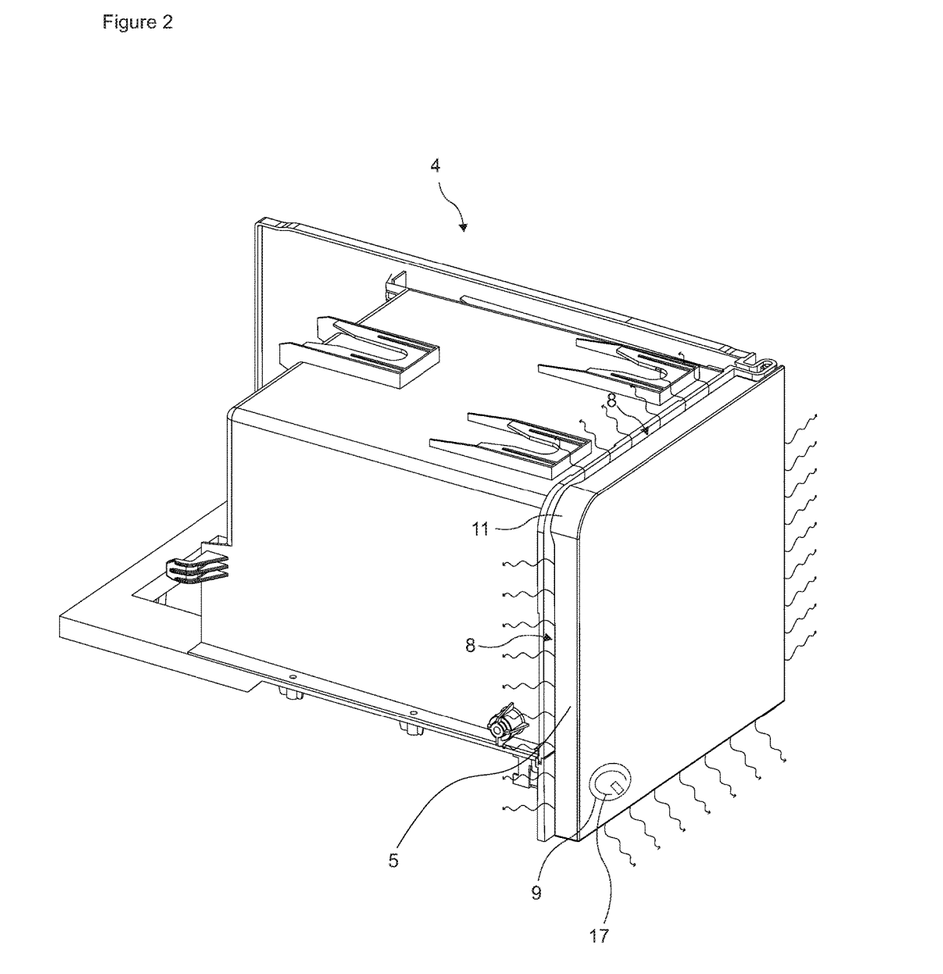
FIG. 2—is the perspective view of the cabinet when the cabinet lid is in the locking position.
Figure 3:
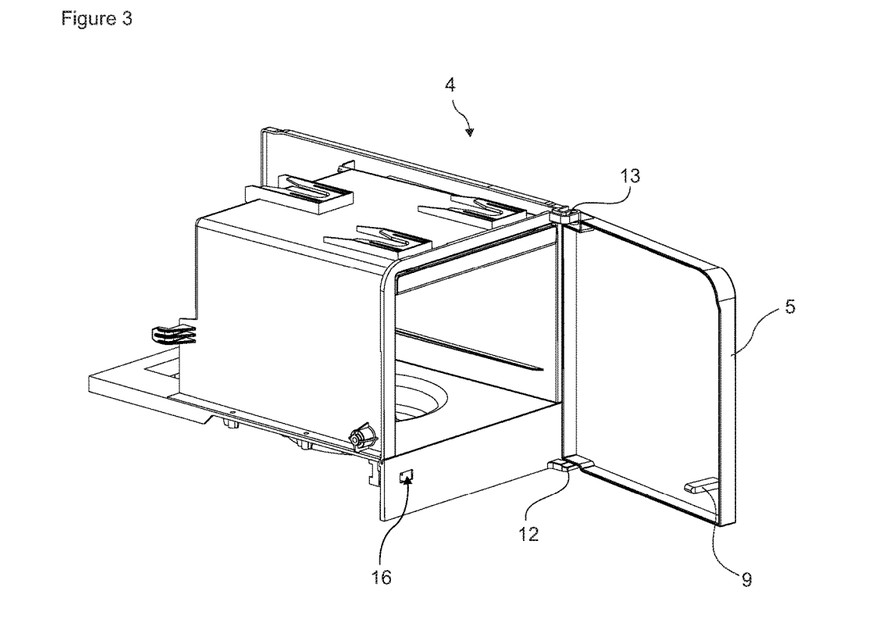
FIG. 3—is the perspective view of the cabinet when the cabinet lid is in the open position.
Figure 4:
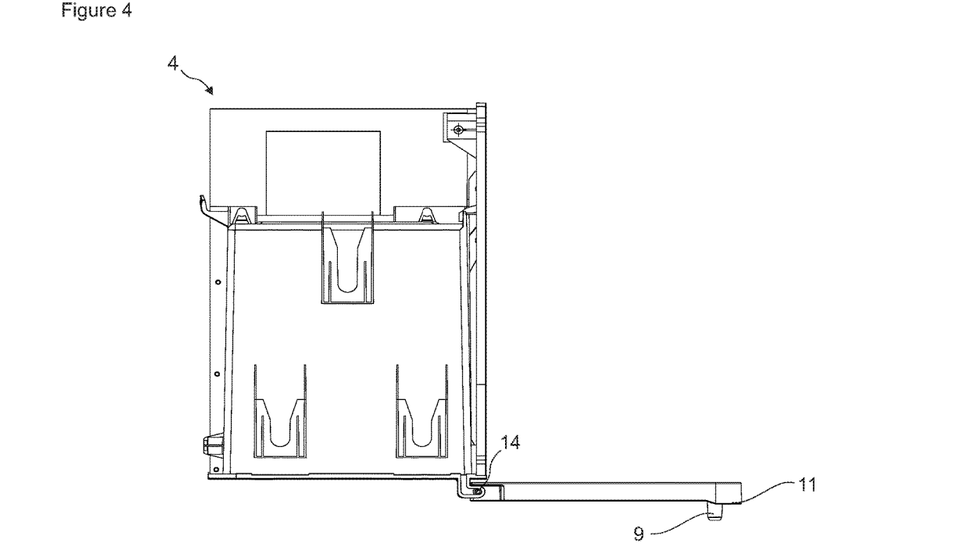
FIG. 4—is the top view of the cabinet when the cabinet lid is in the open position.
Figure 5:
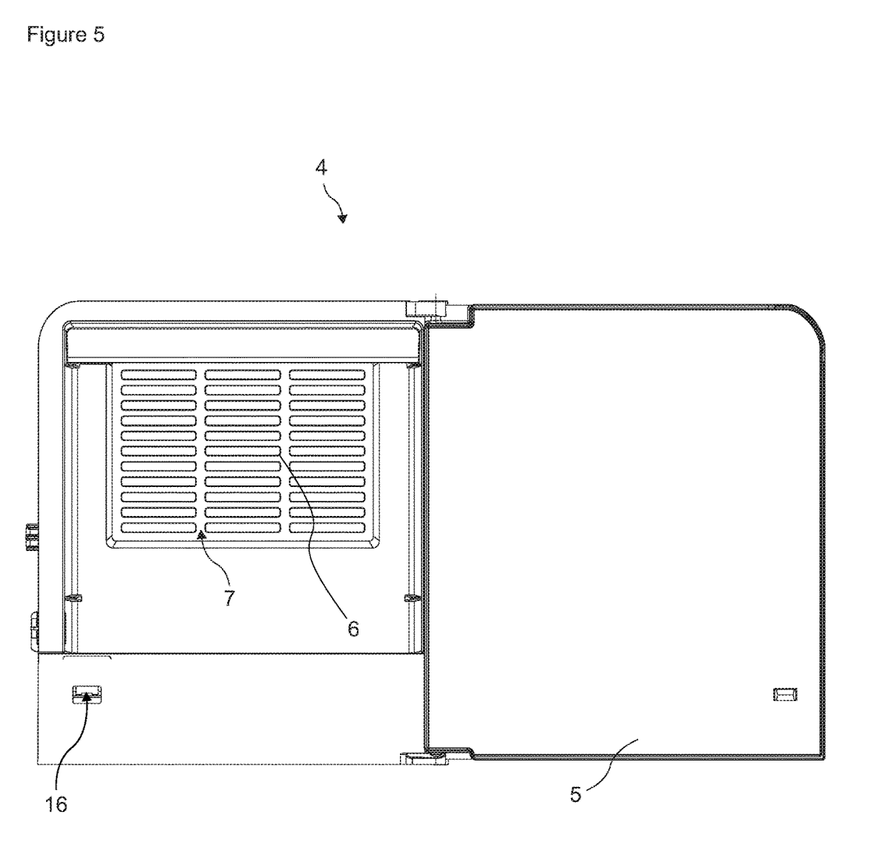
FIG. 5—is the front view of the cabinet when the cabinet lid is in the open position.

The elements illustrated in the figures are numbered as follows:
1. Refrigerator
2. Fresh food compartment
3. Freezing compartment
4. Cabinet
5. Lid
6. Grating
7. Opening
8. Gap
9. Locking means
10. Shelf 11. Extension
12. First housing
13. Second housing
14., 114. Pin
15. Inclined surface
16. Locking housing
17. Indicator The refrigerator (1) comprises a fresh food compartment (2) wherein foodstuffs to be cooled are placed; a freezing compartment (3) wherein foodstuffs to be frozen are placed; a cabinet (4) that is placed into the freezing compartment (3) and that enables foodstuffs to be stored therein or enables ice cream to be made by placing an ice cream making device (not shown in the figures) therein; a lid (5) that is situated on the front side of the cabinet (4) and that has an open position wherein access into the cabinet (4) is provided and a closed position whereto the lid (5) is brought by being rotated from the open position, wherein the front side of the cabinet (4) is closed; at least one grating (6) that is arranged on the freezing compartment (3) wall that blows cold air into the cabinet (4); and at least one opening (7) that is arranged on the cabinet (4) rear wall and that enables the air delivered through the grating (6) to be delivered into the cabinet (4) (FIG. 1).

The refrigerator (1) furthermore comprises:
a locking means (9) that is situated on the lid (5), that extends from lid (5) towards the cabinet (4), and that enables the lid (5) situated on the cabinet (4) front wall to be locked with the cabinet (4) in the closed position and that assures that a gap (8) allowing air flow remains between the lid (5) and the cabinet (4) front wall in the closed position
(FIG. 1, FIG. 2, FIG. 3, FIG. 4, FIG. 5, FIG. 8).

In the refrigerator (1) of the present invention, the locking means (9) is fixed to the cabinet (4) when the lid (5) is changed to the closed position. The locking means (9) is preferably seated into a locking housing (16) that is arranged on the cabinet (4). Thus, the lid (5) is enabled to be kept in the closed position by locking with the cabinet (4). The locking means (9) is formed so as to leave the gap (8) between the cabinet (4) and the lid (5). The gap (8) allows the air blown through the grating (6) and entering into the cabinet (4) by means of the opening (7) to exit the cabinet (4) and allows the cold air in the freezing compartment (3) to enter the cabinet (4), providing an efficient air circulation.

In an embodiment of the present invention, the refrigerator (1) comprises the lid (5) that is pivotally connected to the cabinet (4) front wall from one side thereof.

In an embodiment of the present invention, the refrigerator (1) comprises a shelf (10) disposed in the freezing compartment (3) and the cabinet (4) that is placed on the shelf (10).

In an embodiment of the present invention, the locking means (9) is situated on the lid (5) close to the lower side of the lid (5). Thus, the user can easily access the locking means (9).

In an embodiment of the present invention, the locking means (9) is operated by the push in-pop out method that enables the lid (5) to be changed to the locking position by being pushed thereon and that enables the lid (5) to be changed from the locking position to the open position again by being pushed thereon. The locking means (9), seating into the locking housing (16) when pressed thereon, enables the lid (5) to be locked with the cabinet (4) and the locking means (9) easily detaches from the locking housing (16) when pressed thereon once more and enables the lid (5) to be opened.

In another embodiment of the present invention, the refrigerator (1) comprises the locking means (9) that is situated on the lid (5), at a corner, preferably the lower corner, close to the side opposite the side whereto the lid (5) is connected and where the hinge system opens/closes, and also comprises an extension (11) that extends to the cabinet (4) front wall from a corner apart from the corner whereon the locking means (9) is situated, preferably from the other corner of the side whereon the locking means (9) is situated and that contacts the cabinet (4) front wall in the locking position. In the locking position of the lid (5), the extension (11) bears against the cabinet (4) front wall and prevents the lid (5) from stretching at this region (preferably upper corner) and the user can open the lid (5) only by pushing it from the region (preferably lower corner) where the locking means (9) is situated.

In an embodiment of the present invention, the refrigerator (1) comprises a first housing (12) that extends from the cabinet (4) front wall outwards, a second housing (13) that extends opposite the first housing (12) so that a distance remains therebetween, and two pins (14, 114) that are situated on the lid (5) and that enable the lid (5) to be connected to the cabinet (4) by one thereof being seated into the first housing (12) and the other into the second housing (13).

Figure 6:
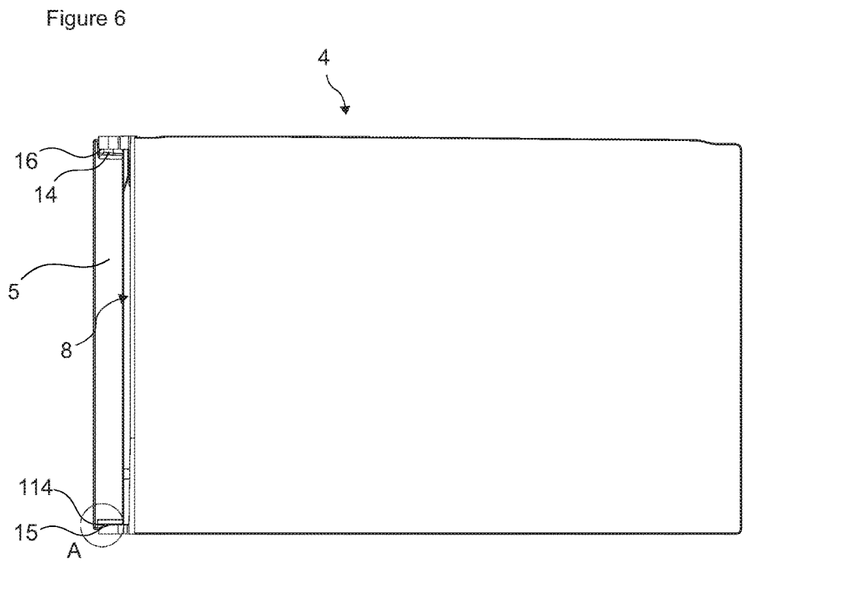
FIG. 6—is the sideways view of the cabinet when the cabinet lid is in the closed position in an embodiment of the present invention.
Figure 7:
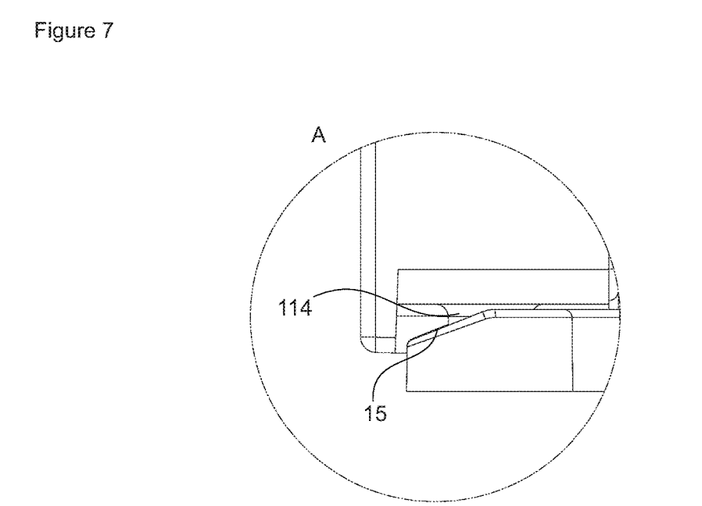
FIG. 7—is the view of detail A in FIG. 6.
Figure 8:
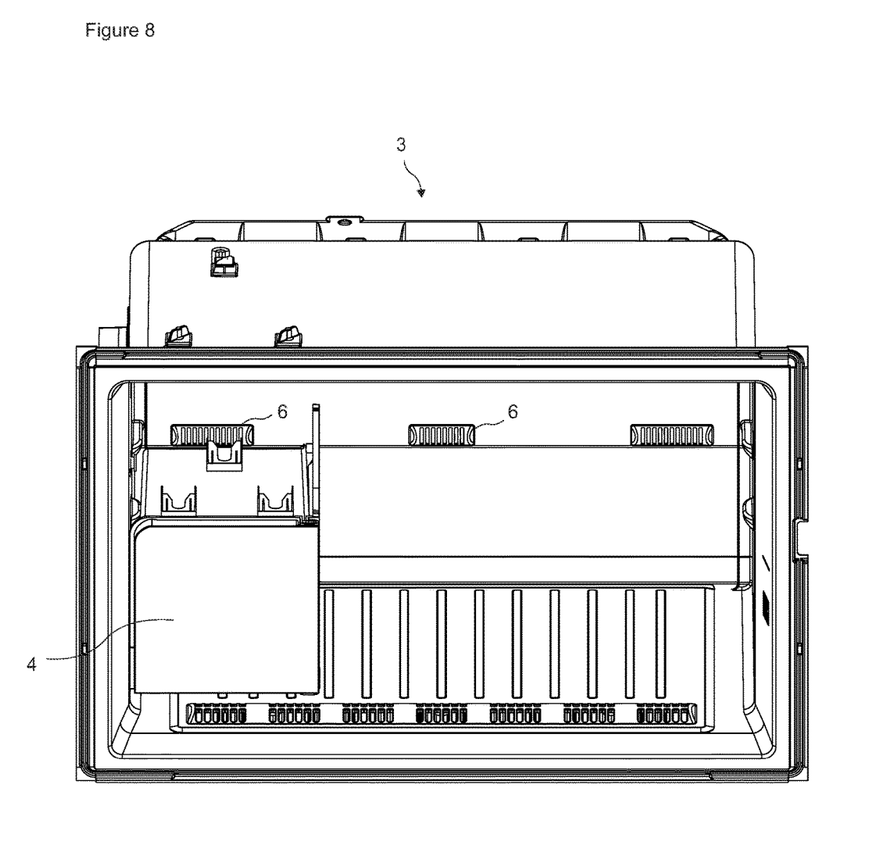
FIG. 8—is the front schematic view of a freezing compartment wherein the cabinet is placed.

In an embodiment of the present invention, the cabinet (4) comprises an inclined surface (15) that is arranged on the first housing (12) and that faces the second housing (13). After one of the pins (14) on the lid (5) is inserted into the second housing (13) preferably having the flat surface, the other pin (114) is slid over the inclined surface (15) to be inserted into the first housing (12) and thereby the lid (5) is connected to the cabinet (4) (FIG. 6, FIG. 7).

In an embodiment of the present invention, the lid (5) comprises an indicator (17) that is situated on the locking means (9) and that indicates the position of the locking means (9). The user changes the lid (5) to the locking position by pushing lid (5) from the area where the indicator (17) is situated and opens the lid (5) by pushing from the same area once more.

By means of the present invention, a refrigerator (1) is realized, that has a cabinet (4) enabling ice cream to be made by placing an ice cream making machine therein and that can be used as a storage compartment by taking out the receptacle therefrom, that enables an efficient air circulation and refrigeration by means of the gap (8) left in the locking position of the lid (5) and that has the locking means (9) the esthetic appearance of which is improved thanks to the opening of the locking means (9) by the user pushing the lid (5) at the right point, the other portions of the lid (5) being prevented from stretching by means of the extension (11), the lid (5) being opened/closed only from the region where the locking means (9) is situated by means of the indicator (17) and the locking means (9) being concealed and invisible.

The invention claimed is:

1. A refrigerator (1) comprising a fresh food compartment (2) wherein foodstuffs to be cooled are placed, a freezing compartment (3) wherein foodstuffs to be frozen are placed and
a cabinet (4) disposed into the freezing compartment (3),
a lid (5) that is situated on the front side of the cabinet (4) and that has an open position wherein access into the cabinet (4) is provided and a closed position whereto the lid (5) is brought by being rotated from the open position, wherein the front side of the cabinet (4) is closed, at least one grating (6) that is arranged on a wall of the freezing compartment (3) and that blows cold air into the cabinet (4), and at least one opening (7) that is arranged on a rear wall of the cabinet (4) and adjacent to the at least one grating to enable the air delivered through the grating (6) to be delivered into the cabinet (4) characterized by a locking means (9) that is situated on a first corner of the lid (5), that extends from lid (5) towards the cabinet (4), and that enables the lid (5) situated on a front wall of the cabinet (4) to be locked with the cabinet (4) in the closed position and that assures that a gap (8) allowing air flow remains between the lid (5) and the front wall of the cabinet (4) in the closed and locked position, and an extension provided on a second corner opposite from the first corner of the lid, extending from the lid to the cabinet front wall, wherein the extension of the lid bears against the cabinet front wall in the closed and locked position, wherein the locking means and the extension are provided on the lid opposite from a side where the lid is connected to the cabinet characterized by a first housing (12) that extends from the cabinet (4) front wall outwards, a second housing (13) that extends opposite the first housing (12) so that a distance remains therebetween, and two pins (14, 114) that are situated on the lid (5) and that enable the lid (5) to be connected to the cabinet (4) by one thereof being seated into the first housing (12) and the other into the second housing (13), and an inclined surface (15) that is situated on the first housing (12) and that faces the second housing (13).

2. A refrigerator (1) as in claim 1, characterized by the lid (5) that is pivotally connected to the cabinet (4) front wall from one side thereof.

3. A refrigerator (1) as in claim 1, characterized by a shelf (1) disposed in the freezing compartment (3) and the cabinet (4) placed on the shelf (10).

4. A refrigerator (1) as in claim 1, characterized by the locking means (9) that is situated on the lid (5) close to the lower side of the lid (5).

5. A refrigerator (1) as in claim 1, characterized by the locking means (9) being a push in-pop out type of locking means that enables the lid (5) to be changed to the locking position by being pushed thereon and that enables the lid (5) to be changed from the locking position to the open position again by being pushed thereon.

6. A refrigerator (1) as in claim 1, wherein the locking means (9) is situated on the lid (5), at a lower corner, close to the side opposite the side whereto the lid (5) is connected and where the hinge system opens/closes.

7. A refrigerator (1) as in claim 1, characterized by an indicator (17) that is situated on the locking means (9) and that indicates the position of the locking means (9).

8. A refrigerator (1) as in claim 1, characterized by a shelf (10) disposed in the freezing compartment (3) and the cabinet (4) placed on the shelf (10).

9. A refrigerator (1) as in claim 8, characterized by the locking means (9) that is situated on the lid (5) close to the lower side of the lid (5).

10. A refrigerator (1) as in claim 9, characterized by the locking means (9) that is operated by the push in-pop out method that enables the lid (5) to be changed to the locking position by being pushed thereon and that enables the lid (5) to be changed from the locking position to the open position again by being pushed thereon.

11. A refrigerator (1) as in claim 10, wherein the locking means (9) is situated on the lid (5), at a lower corner, close to the side opposite the side whereto the lid (5) is connected and where the hinge system opens/closes.

12. A refrigerator (1) as in claim 11, characterized by a first housing (12) that extends from the cabinet (4) front wall outwards, a second housing (13) that extends opposite the first housing (12) so that a distance remains therebetween, and two pins (14, 114) that are situated on the lid (5) and that enable the lid (5) to be connected to the cabinet (4) by one thereof being seated into the first housing (12) and the other into the second housing (13).

13. A refrigerator (1) as in claim 12, characterized by an inclined surface (15) that is situated on the first housing (12) and that faces the second housing (13).

14. A refrigerator (1) as in claim 13, characterized by an indicator (17) that is situated on the locking means (9) and that indicates the position of the locking means (9).

* * * * *